Feb. 23, 1954  W. J. DWYER  2,669,824
DRIVE FOR CORN PICKERS
Original Filed Dec. 15, 1945  5 Sheets-Sheet 1

INVENTOR
William J. Dwyer
BY
Emerson B. Donnell
ATTORNEY.

Feb. 23, 1954

W. J. DWYER 2,669,824

DRIVE FOR CORN PICKERS

Original Filed Dec. 15, 1945

INVENTOR

William J Dwyer

BY

Emerson B Donnell

ATTORNEY

Feb. 23, 1954  W. J. DWYER  2,669,824
DRIVE FOR CORN PICKERS
Original Filed Dec. 15, 1945  5 Sheets-Sheet 5
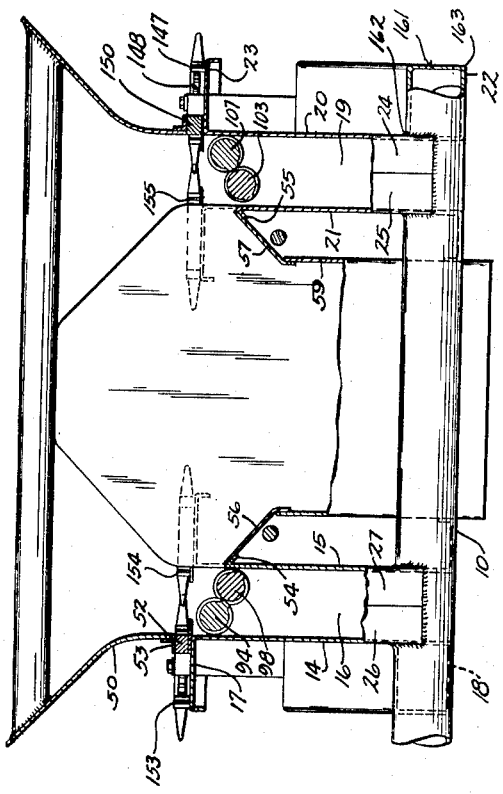
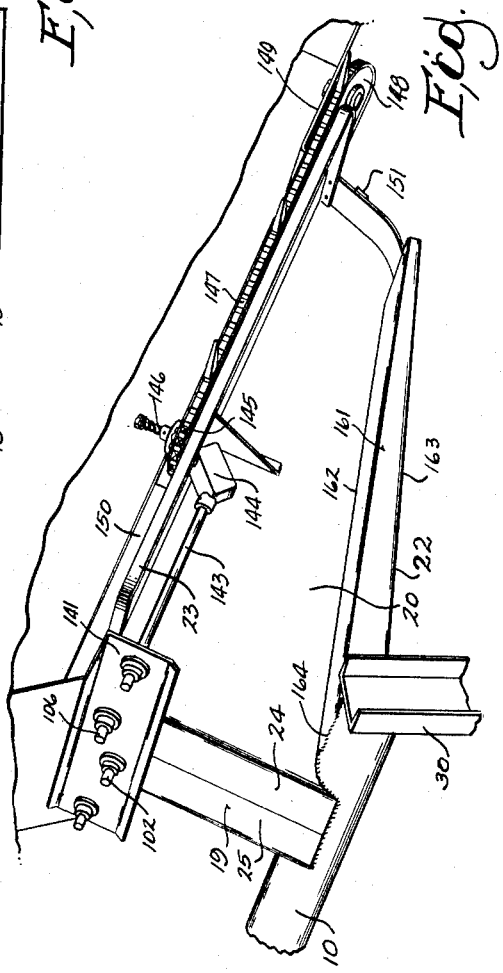
INVENTOR
William J. Dwyer
BY
Emerson B. Donnell
ATTORNEY Patented Feb. 23, 1954

2,669,824

UNITED STATES PATENT OFFICE 2,669,824

DRIVE FOR CORN PICKERS

William J. Dwyer, Battle Creek, Mich., assignor to J. I. Case Company, Racine, Wis., a corporation of Wisconsin Original application December 15, 1945, Serial No. 635,256. Divided and this application September 11, 1950, Serial No. 184,323

1 Claim. (Cl. 56—18)

The present invention relates to agricultural machines and more particularly to corn pickers and an object thereof is to generally improve the construction and operation of machines of this type.

This application is a division of application Serial No. 635,256 filed December 15, 1954, which has matured into Patent No. 2,527,802.

Corn pickers of the type including substantially parallel forwardly and downwardly extending rollers are well-known and the present invention relates to machines having these general characteristics. Such machines in the past however have been heavier and more complex than necessary and accordingly a further object of the invention is to materially simplify such a machine and at the same time to materially reduce the weight thereof and accordingly the cost of the material necessary to produce it.

A further object is to reduce the cost of such a machine by providing a novel construction which will greatly reduce the number of operations and accordingly the amount of labor necessary to produce and assemble the machine.

Further objects are to provide improved expedients for shifting the machine laterally to avoid unnecessary trampling of the crop when opening a field; to improve the cleaning expedients; to materially stiffen and strengthen the construction and to simplify the mechanism for driving the various units of the machine.

Further objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein claimed.

Similar reference characters have been applied to the same parts throughout the specification and the accompanying drawings in which:

Fig. 5 is a fragmentary sectional view on the line 5—5 of Fig. 2;

Fig. 6 is a perspective view of certain structure indicated in Fig. 2 taken from the right and slightly to the rear;

Fig. 7 is a plan view of a portion of the structure shown in Fig. 1 with parts broken away showing the parts in a different position;

Fig. 8 is a plan view with parts broken away and considerably enlarged of gearing and clutch mechanism indicated in Fig. 1;

Fig. 9 is an enlarged view taken normal to certain snapping rolls indicated in Fig. 3 substantially on the line 9—9 of Fig. 3:

Figure 1:
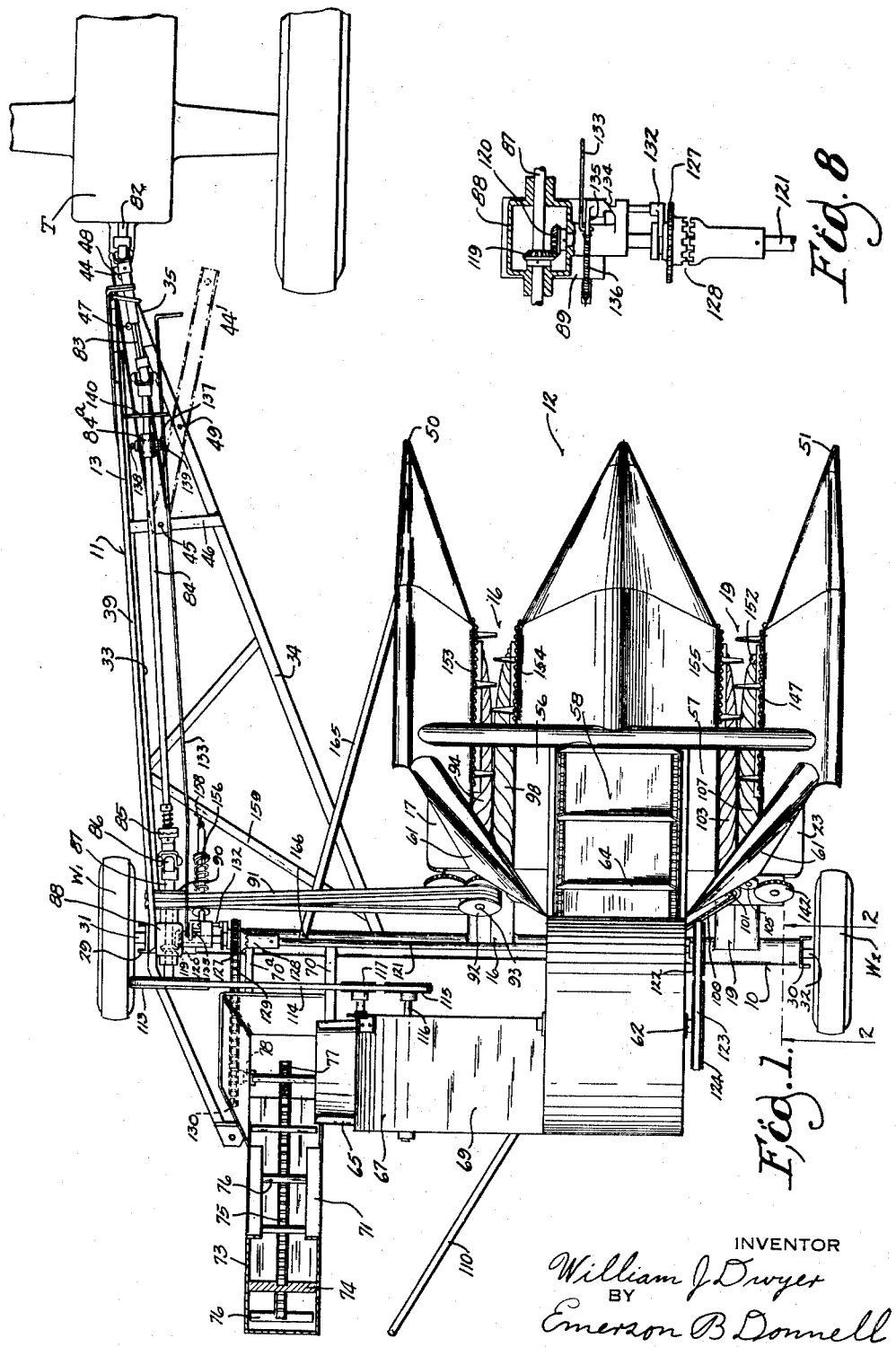
Fig. 1 is a plan view of a two-row machine embodying the invention.
Figure 3:
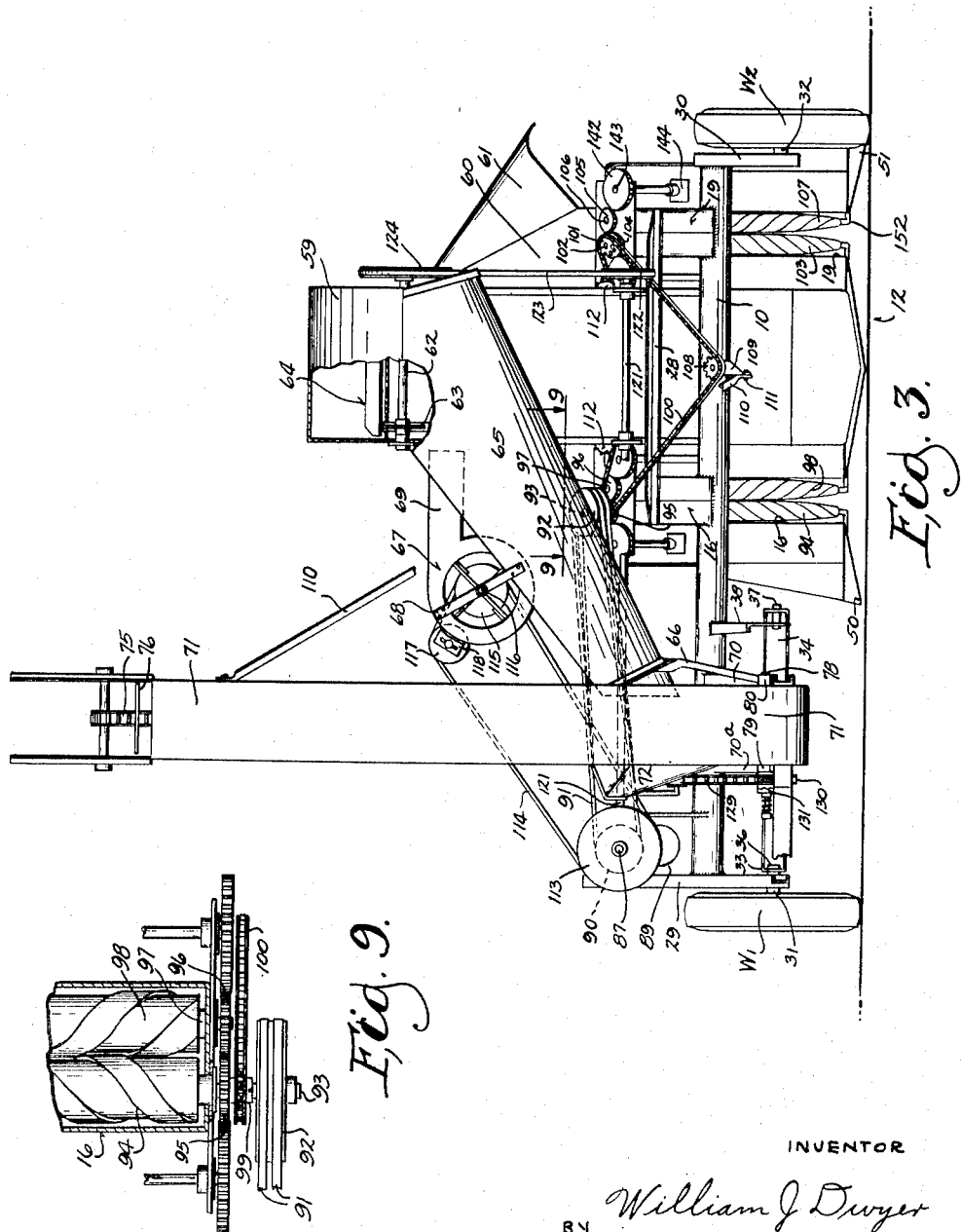
Fig. 3 is a rear elevation of the structure shown in Fig. 1 with parts broken away and shown in section.

As seen in Figs. 1 and 3, the machine comprises supporting wheels $W^1$ and $W^2$ and a stress bearing member generally designated as 10 serving as a main foundation or backbone of the machine. Member 10 has pivoted thereto a draw bar generally designated as 11 and a picking unit generally designated as 12 in the present instance operative on two rows of corn at the same time. Unit 12 is rigidly mounted on member 10, the latter being controlled by an adjusting lever generally designated as 13, the structure so far recited constituting the main elements of the machine. It will now be apparent that the corn picker does not have the usual type of frame, the member 10 taking its place, and the picking unit 12 being united therewith in a novel manner as will appear.

Figure 2:
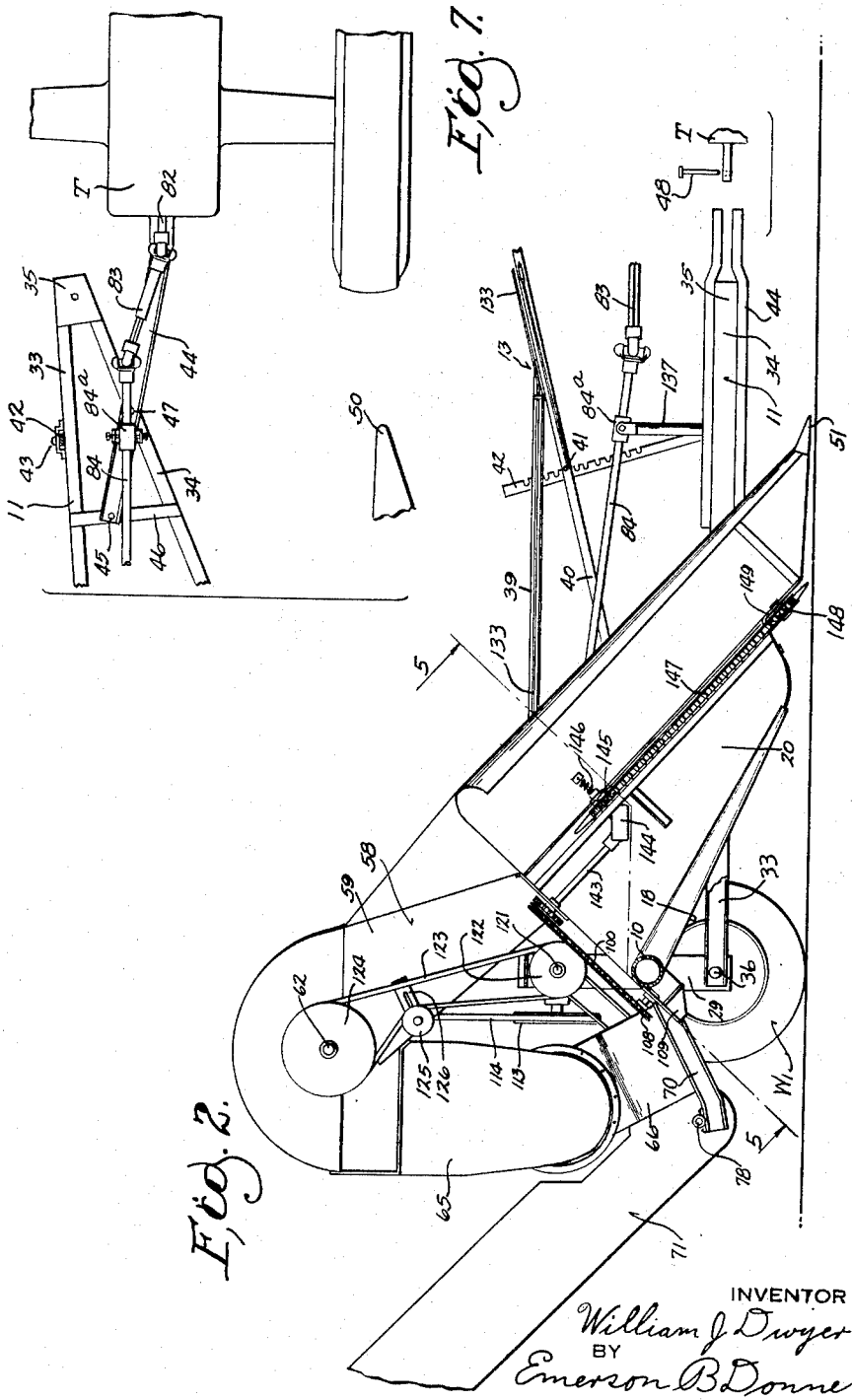
Fig. 2 is a right side elevation of the machine taken along line 2—2 of Figure 1.

Member 10 in the present instance comprises a tube or pipe of substantial size so as to have the stability in bending and torsion necessary to carry the weight of the entire machine and the twisting stress imposed by the overhung picking member 12. Rigidly fixed to member 10 and extending forwardly therefrom is a pair of uniplanar plates 14 and 15 best seen in Fig. 5. These uniplanar plates are spaced apart to form a stalkway 16 for the downward passage of the corn stalks in well-known manner. Plates 14 and 15 are made of sufficient thickness to be self-supporting and are preferably welded to pipe 10. Plate 14 has an outwardly turned flange 17 at its upper extremity and an outwardly turned flange 18 at its lower extremity, flange 18 being also preferably welded to pipe 10. In this manner, plate 14 is very strongly united to pipe 10, in fact so strongly as to be capable of supporting other elements of the machine. A substantially similar arrangement in the present instance provides a second stalkway 19, plates 20 and 21 being also united to pipe 10 so that two rows of corn may be picked simultaneously. Plate 20 has a lower outwardly turned flange 22 and an upper outwardly turned flange 23, the two flanges and plate forming a substantially triangular box-like unit as seen in Figs. 2 and 5. Plate 20 at its rear extremity has an inwardly turned flange 24 which meets and is preferably fastened to an inwardly turned flange 25 on above mentioned plate 21 so that stalkway 19 is open at the top and bottom but closed at the back by flanges 24 and 25. In similar manner, stalkway 16 is closed at the back by flanges 26 and 27. An angle iron brace 28 preferably extends between and unites flanges 24, 25, 26 and 27. It will now be apparent that the main structural support of the machine comprises tubular member 10 and stalkways 16 and 19, the other major portions of the machine becoming fastened to and supported by this structure.

Member 10 has downwardly extending channel members 29 and 30 to which are attached stub axles 31 and 32 for supporting the machine from wheels $W^1$ and $W^2$. In this way member 10 is disposed substantially above the axis of wheels $W^1$ and $W^2$ so as to give ample clearance for stalks and trash beneath the machine.

Draw bar 11 is composed in the present instance of channels 33 and 34 united at an apex 35, the channels being spaced apart at their rear extremities as seen in Fig. 1. Channel 33 is pivoted to above mentioned channel 29 at 36 while channel 34 is pivoted at 37 to a bracket 38 rigidly united with pipe 10. Channel 29 extends upwardly and has united therewith an upper member 39 and a lower member 40 of above mentioned adjusting lever 13, lever 13 having a detent 41 engageable with a rack or quadrant 42 connected at 43 with draw bar 11 so that the angular position of pipe 10 (and accordingly of picker unit 12) can be adjusted by means of lever 13, the adjustment being maintained by rack 42.

Draw bar 11 has a tongue portion 44 which in the present instance is bifurcated and pivoted at 45 to a cross member 46 carried by side channels 33 and 34. Tongue 44 is fixed substantially lengthwise of channel 33 by means of a pin or the like 47 fixed in relation to apex portion 35. Tongue 44 therefore becomes a rigid part of draw bar 11 and is connected with a tractor T by means of a hitch pin 48. It will now be apparent that tractor T may be run in a substantially offset position relatively to picker unit 12. Tongue 44, however, may be swung to the dotted position of Fig. 1 about pivot 45, pin 47 being first removed and then replaced in an opening 49 in channel 34. In this manner, the machine will take up a position substantially more nearly directly behind tractor T, thus bringing the tractor and picker unit 12 as close together as practical. In this position, the outfit may proceed through the field without disturbing more than one row of corn in addition to those picked by unit 12. Also this position of tongue 44 narrows the assemblage for more convenient passage through farm gates and for transportation on the highway.

Flanges 17 and 23 forming the upper margins of plates 14 and 20 respectively form the supporting means for outer picker points 50 and 51 which may be of any suitable construction insofar as support from plates 14 and 20 is concerned, in the present instance a strip of wood 52 being mounted on flange 17 and carrying point 50 by means of an angle iron brace 53. Point 50 is formed of sheet metal bent to the necessary shape in well-known manner. Point 51 is mounted in a similar manner on flange 23. Inner plates 15 and 21 have downwardly turned flanges 54 and 55 extending substantially parallel to above mentioned flanges 17 and 23 and supporting at their upper portions plates 56 and 57, together forming a hopper or chute for corn ears leading from the stalkways into a main or primary elevator or conveyor generally designated as 58. Elevator 58 is of a type well-known in corn pickers of this general type and should not need be described in detail. Sufficient to say, it comprises a housing 59 supported on above mentioned angle iron 28, housing 59 being united to picker points 50 and 51 by guiding sheets as 60 and 61. Housing 59 has a shaft 62 journaled therein carrying sprockets as 63 for driving a raddle type elevator generally designated as 64 of well-known type and which does not need to be further described, elevator 64 raising ears picked by the machine to a point above a chute 65 inclined downwardly and to the left as seen in Fig. 3. Chute 65 is supported from above mentioned housing 59 and at its lower end on a bracket 66 extending rearwardly from tubular member 10, the chute 65 serving to transmit the picked ears to a wagon elevator as will appear.

For cleaning the harvested crop, a fan 67 is supported above chute 65 for example by brackets 68 and has a discharge duct or nozzle 69 directed transversely to the path of the crop in dropping from elevator 64 into chute 65. The right end of chute 65 is open as indicated in Fig. 3 and the blast from nozzle 69 is sufficiently strong to propel substantially all trash, loose husks, etc., out of the right end of chute 65 while the ears being heavier fall through the blast and gravitate toward the left in chute 65.

As seen in Fig. 3, a bracket 70 and a bracket 70a support a wagon elevator generally designated as 71 extending rearwardly from the machine and having a hopper 72 into which ears may empty from chute 65. Elevator 71 is of well-known construction comprising an outer casing 73 having a dividing partition 74 above and below which travels an endless chain 75 carrying a series of buckets 76. Chain 75 is propelled by a sprocket 77 on a shaft 78 carried in bearings 79 and 80 supported on brackets 70 and 70a and in turn pivotally supporting housing 73. Elevator 71 is thus pivotally independent of tubular member 10 and is carried in its rearwardly inclined position by means of a brace or strut 81 in a manner fully described and claimed in the copending application of Magee, Serial No. 415,732, filed October 20, 1941, now Patent Number 2,408,939. It will be apparent that as member 10 and its attached parts are rocked for adjustment the height of picker unit 12, the upper end of elevator 71 is guided by brace 81 and does not rise and fall to any appreciable extent in response to such rocking. This disposition of elevator 71 provides for trailing a receiving wagon directly behind the corn picker which avoids extending the assemblage laterally beyond the tractor even when tractor T is positioned as close as possible to picker unit 12.

In the past, wagons for this purpose have been extended to the opposite side of the tractor from picker unit 12. This, however, is a serious disadvantage when opening a field since it is necessary to pass at least once directly through an area of standing corn. In the past, the picker unit has picked for example two rows while the tractor trampled one or two more which were not picked. The wagon then trailing to the left often trampled another row. Of course on the next round the tractor and wagon would travel in the picked area so that the disadvantage applied only to the field opening process. In the present arrangement, however, since the tractor and the wagon run in a path quite close to picker unit 12, only one row of corn is trampled in addition to those picked, even in the field opening operation. Thus is avoided to a large extent one of the most serious objections to the separate or pull type corn picker, for the elimination of which resort has been had in the past to the cumbersome and expensive tractor mounted type of corn picker.

The operative units of the corn picker are substantially conventional and will be described as they are reached. However, the drives for these units have been substantially simplified and will be described.

Tractor T has a power take-off shaft 82 which drives through a tumbler shaft of well-known type 83, a drive shaft 84 in the present instance slidably journaled in a steady bearing 84ª and driving through a safety clutch 85 and a universal joint 86, a shaft 87 journaled in a gear casing 88 supported on a bracket 89 carried by above mentioned member 10. Shaft 87 carries a pulley 90 which drives through a belt 91 (in the present instance, although not necessarily, a multiple V-belt), a pulley 92 on a shaft 93, being the spindle of a snapping roll 94 located in stalkway 16 in well-known manner. By virtue of the substantial center-distance between pulley 90 and pulley 92 no special provision need be made for the slanted relation of shaft 87 and shaft 93, belt 91 twisting sufficiently to transmit the power without further complication.

Shaft 93 drives through a gear 95 Fig. 9, a gear 96 fixed on a shaft 97 constituting the axis of a snapping roll 98 arranged in stalkway 16 in cooperative relation with above mentioned snapping roll 94. Shaft 93 also drives, through a sprocket 99 and a chain 100, a sprocket 101, Fig. 3, on a shaft 102 constituting the axis of a snapping roll 103 arranged in stalkway 19. Shaft 102 has a gear 104 driving a gear 105 fixed on a shaft 106, constituting the axis of a snapping roll 107 arranged in stalkway 19 in cooperation with above mentioned snapping roll 103. Chain 100 is carried beneath elevator housing 59 on an idler 108 supported on a bracket 109 fixed on member 10. Bracket 109 also carries a brace 110 pivoted thereto at 111 extending to above mentioned elevator 71 to provide against lateral swaying thereof. The upper run of chain 100 passes through elevator casing 59 between the two runs of conveyor 64 and is guided by idlers as 112. Snapping rolls 94, 98, 103 and 107 are of well-known or other suitable construction and need not be further described. It is to be noted that chain 100 and gears 101 and 105, etc., are readily lined up in common planes substantially at right angles to the several snapping rolls, whereas the misalignment between pulleys 90 and 92 is readily accommodated by belt 91. In this manner, a very simple and direct drive is provided for the major power using elements of the machine, all bevel gears being eliminated in this high power drive.

In the present instance axial movement of drive shaft 84 in bearing 84ª provides for rocking of tubular member 10 and its attached parts without interference from said shaft.

For driving fan 47 a pulley 113 is fixed on above mentioned shaft 87 and drives, through a belt 114, a pulley 115 on a shaft 116 of the fan, an idler 117 being adjustably mounted on a bracket 118 for adjusting the tension of the belt.

Gear box 88 has a gear 119, Fig. 8, therein driving through a gear 120, a shaft 121 extending substantially parallel to above mentioned member 10. Shaft 121 extends beneath elevator housing 59, Fig. 3, and has a pulley 122 driving, through a belt 123, a pulley 124 on above mentioned shaft 62. In this manner, elevator 64 is driven from shaft 87. An idler 125 adjustably mounted on a bracket 126 is used for adjusting the tension in belt 123. Shaft 121 also drives wagon elevator 71, a sprocket 127 being slidably journaled on shaft 121 and having clutch teeth engaged with a clutch member 128. Sprocket 127 drives, through a chain 129, a sprocket 130, driving through a safety clutch 131, above mentioned shaft 78. Sprocket 127 may be shifted into and out of engagement with clutch 128 by means of a shipper mechanism 132 of suitable type controlled by a shifter rod 133. In the present instance, shipper 132 is shifted by a cam portion 134 on a lever 135 connected with above mentioned rod 133, lever 135 being urged in a direction to engage sprocket 127 with clutch 128 by means of a spring 136. By disengaging sprocket 127, wagon elevator 71 may be stopped for any purpose as for example changing wagons while any ears coming from elevator 64 may accumulate in chute 65. It will be observed that discontinuing the operation of elevator 71 does not affect in any manner the operation of elevator 64.

Figure 4:
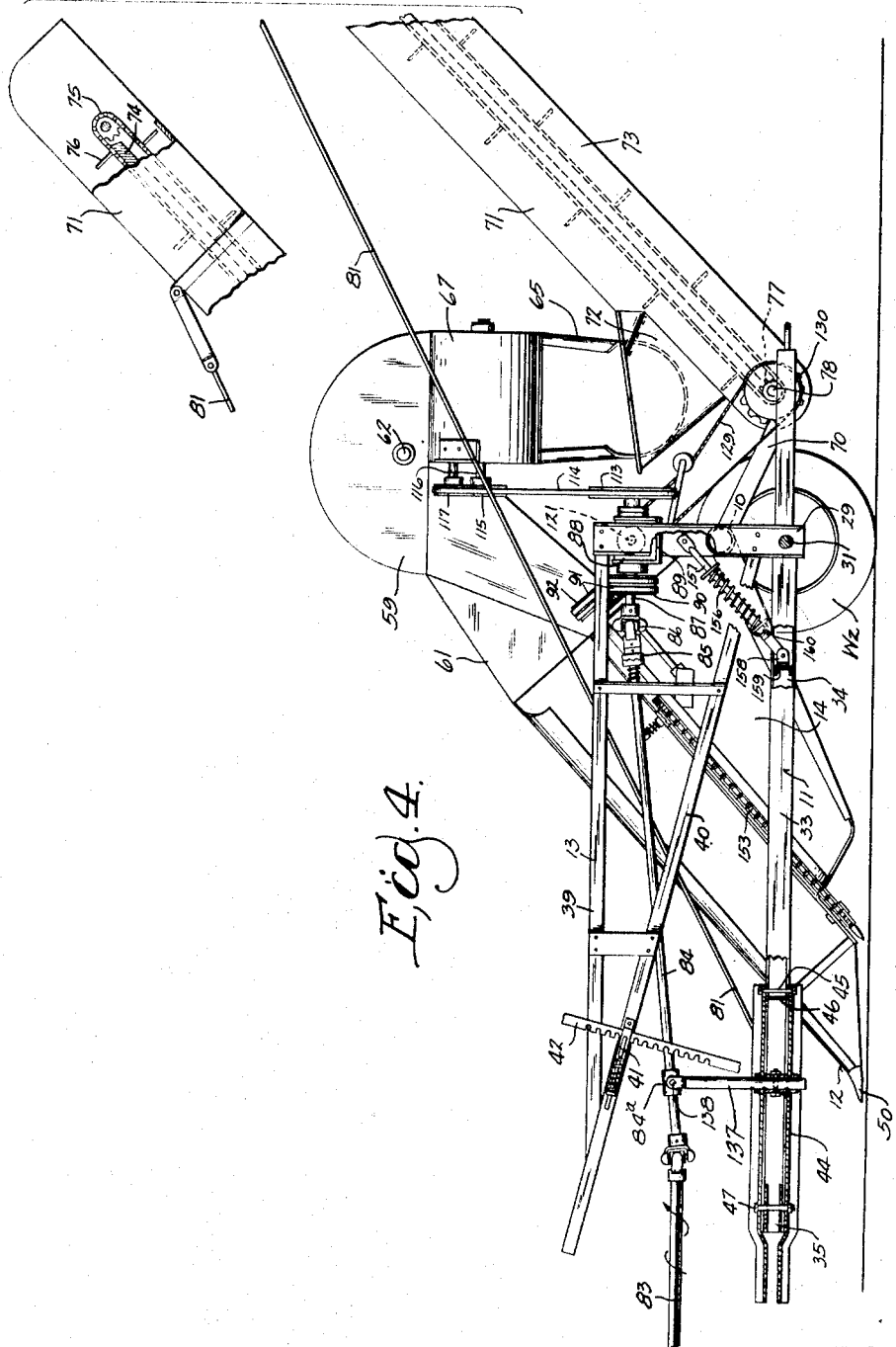
Fig. 4 is a fragmentary left side elevation of the machine.

Bearing 84ª is preferably supported on above mentioned tongue 44 as more particularly seen in Fig. 4. A bifurcated upright 137 supports bearing 84ª in a rockable manner by means of pivots 138 and 139 while upright 137 may pivot about a substantially vertical axis in tongue 44 so as to be self aligning with relation to shaft 84. Swinging of tongue 44 therefore causes no binding of bearing 84ª. However, an advantage results from the connection of bearing 84ª with tongue 44 in that swinging of tongue 44 alters the position of shaft 84 so as to keep it generally directed toward tractor T in either the full line or dotted line position of Fig. 1 so as to avoid excessive angular displacement of tumbler shaft 83. This is well illustrated in Fig. 7. By virtue of this arrangement the several shafts will operate freely in either position of tractor T.

Shifter rod 133 is slidable in a bracket 140 in the present instance extended from adjusting lever 13.

This constitutes a description of the major units of the machine although it might be further noted that shafts 102 and 106 are supported in suitable bearings in a plate 141 fixed in relation to above mentioned flanges 24 and 25. A substantially similar construction is used in relation to shafts 93 and 97.

It is to be understood that the machine has gathering chains of substantially conventional type; for example, gear 105 driving a gear 142 on a shaft 143 extending into a gear box 144 through which is driven a sprocket 145 by means of a safety clutch 146. A gathering chain 147 extends about sprocket 145 and a sprocket 148 carried on a plate 149 extending forwardly from above mentioned flange 22, chain 147 extending about a spacer 150 corresponding with above mentioned spacer 52. Plate 149 forms a foundation for sprocket 148 and also for the lower end of snapping roll 107, a bracket 151 being fixed thereto and carrying a journal portion 152 on which roll 107 is rotatable in well-known manner. It will be understood that a gathering chain 153 similar to 147 is associated with roll 94 and driven in substantially identical manner to chain 147. Gathering chains of substantially conventional type 154 and 155 are associated with rolls 98 and 103 and driven in a manner substantially identical with above described chains 147 and 153.

In order to facilitate adjustment of picker unit 12 a compression spring 156 disposed on a telescoping strut 157 is interposed between above mentioned bracket 89 and an ear 158 on a cross brace 159 of draw bar 11. The outward pressure of spring 56 may be adjusted by means of a nut 160 so as to substantially counterbalance the overhanging weight of member 12.

If desired, above mentioned flange 22 may be further strengthened by a portion 161 forming therewith a closed tapered box section. Member 161 is preferably integrally united at 162 and 163 with plate 20 and flange 22 respectively and with tubular member 10 at 164, as for example, by welding. In this manner, plate 20 is materially strengthened against the stresses developed in operation and caused by the weight of attached parts. It is contemplated that similar bracing may be applied to plates 14, 15 and 21 if desired. A brace 165 is extended if desired between a bracket 166 on member 10 and flange 18.

It is thought that the operation of the invention will be clear from the above description and that suitable and advantageous structure has been provided for the realization of the above objects hereinbefore stated. The above being a complete description of an illustrative embodiment of the invention, what is claimed as new and desired to be secured by Letters Patent of the United States is:

A driving means for use in a corn picker, said corn picker having a drawbar disposed generally in the direction of progress of the corn picker, snapping rolls disposed in a forwardly and downwardly inclined position as related to said direction of progress, a cleaning fan having an axis disposed generally in said direction of progress and an ear elevator having a driving shaft disposed generally normal to said direction of progress; the combination of a drive shaft disposed generally in said direction of progress, a V-belt pulley on said drive shaft, a driven V-belt pulley, spaced from the first-mentioned pulley on a forwardly and downwardly inclined axis, a V-belt connecting said pulleys, a second pulley on said drive shaft, a pulley spaced from said second pulley on an axis extending generally forwardly, a belt connecting the second pulley and the last-mentioned pulley, a bevel gear set on said drive shaft, a cross shaft disposed substantially normal to said direction of progress, and driven from said drive shaft through said bevel gear set, a third pulley on said cross shaft, a pulley spaced from said third pulley on an axis substantially normal to said direction of progress, and a belt connecting the last-mentioned pulleys.

WILLIAM J. DWYER.

References Cited in the file of this patent

UNITED STATES PATENTS

| Number | Name | Date |
| --- | --- | --- |
| 1,717,882 | Johnson | June 18, 1929 |
| 2,323,087 | Everett | June 29, 1943 |
| 2,337,592 | Coultas et al. | Dec. 28, 1943 |
| 2,467,790 | Welty | Apr. 19, 1949 |
| 2,527,802 | Dwyer | Oct. 31, 1950 |